US007392718B2

(12) United States Patent
Emoto

(10) Patent No.: US 7,392,718 B2
(45) Date of Patent: Jul. 1, 2008

(54) SAMPLE TEMPERATURE ADJUSTING SYSTEM

(75) Inventor: Keiji Emoto, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 289 days.

(21) Appl. No.: 11/272,560

(22) Filed: Nov. 10, 2005

(65) Prior Publication Data

US 2006/0107769 A1 May 25, 2006

(30) Foreign Application Priority Data

Nov. 10, 2004 (JP) ............................ 2004-326097

(51) Int. Cl.
*G01N 1/00* (2006.01)

(52) U.S. Cl. .................................................. 73/863.11

(58) Field of Classification Search ............... 73/863.11
See application file for complete search history.

(56) References Cited

U.S. PATENT DOCUMENTS 4,865,871 A * 9/1989 Livesey et al. ............... 435/1.3
5,092,183 A * 3/1992 Leichnitz ................. 73/863.11
5,711,446 A * 1/1998 Jeffs et al. ................ 220/23.83
6,646,238 B1 * 11/2003 Fuhr et al. .................. 219/521

FOREIGN PATENT DOCUMENTS

JP 6-137734 * 5/1994
WO WO 91/12888 9/1991
WO WO 95/15671 6/1995
WO WO 98/06876 2/1998
WO WO 00/36880 6/2000

* cited by examiner

*Primary Examiner*—Robert R Raevis
(74) *Attorney, Agent, or Firm*—Cowan, Liebowitz & Latman, P.C.

(57) ABSTRACT

Disclosed is a temperature adjusting system for adjusting temperature of a sample, that includes a sample container for containing a sample therein, and a cooling unit for applying a liquid to a surface of the sample container, to cool the sample on the basis of heat of vaporization of the liquid on the surface of the sample container.

10 Claims, 8 Drawing Sheets

SAMPLE TEMPERATURE ADJUSTING SYSTEM

FIELD OF THE INVENTION AND RELATED ART

This invention relates to an adjusting system for adjusting temperature of a sample. More particularly, the invention concerns a sample temperature adjusting system suitably usable in an apparatus for achieving Plymerase Chain Reaction (PCR) method.

As one method for clarifying the life phenomenon, molecular biology that is focused on molecular-level researches on the living being has been advanced drastically in recent years, and numerous researches are now being continued. The main target of the molecular biology is protein which is the breadwinner of the life phenomenon as well as gene that designs and controls the protein. The genetic information of the living being is stored in gene DNA. Thus, the base sequence stored in the DNA is the essence of heredity.

Determination of the DNA sequence requires a cloning process to be performed as a preliminary step thereof.

Recently, Polymerase Chain Reaction method (PCR method) has been developed, according to which method genes can be cloned relatively easily as long as information related to the gene base sequence is available.

The PCR method is a method in which DNA synthesis reaction based on DNA synthetic enzyme and two types of primers, sandwiching a particular DNA region, is repeatedly effected in a test tube, by which the particular DNA region is amplified by several hundreds thousands times. As a specific example, the cycle comprises: (1) one minute at 95° C. (thermal denaturation reaction time); (2) 30 seconds at 37° C. (primer annealing time); and (3) three minutes at 65° C. (taq-polymerase reaction) The process is repeated successively by 20 to 40 times.

Conventional systems for achieving the PCR reaction generally have a structure that containers each having a DNA reaction solution contained therein are contacted to a coolant (here this being defined as a gas or liquid such as air or water to be used for both of heating and cooling) being adjusted to a temperature suitable for the reaction, respectively. Thus, on the basis of heat exchange using a coolant as described above, the temperature of the DNA reaction solution is changed.

With such conventional structures, however, in respect to high-speed change of the temperature of samples, the response of the cooling process is not good and it does not meet rapid cooling. Furthermore, there is a problem that, with the cooling method based on heat transfer, the amount of heat transfer (i.e., cooling amount) decreases as the sample temperature becomes close to the temperature of the coolant and, as a result, it takes a long time until the sample itself reaches a desired temperature.

International Publications, Publication Nos. WO91/12888, WO95/15671, WO98/06876 and WO00/36880 propose structures for directly heating a sample by using microwaves.

The structure disclosed in International Publication No. WO91/12888 will now be discussed as an example, with reference to FIG. 6 of the drawings attached to this specification. In FIG. 6, sample containers 65 each containing a sample 66 therein are in contact with a coolant 102 so that the sample containers 65 can be cooled by the coolant 102. The heating of the sample 66 is carried out by using microwaves emitted from a magnetron 63. The microwaves have a function for vibrating molecules that constitute the sample 66 itself at high speed, such that heat is generated through the friction among the molecules. Thus, in this structure the sample 66 can be heated directly.

However, in the structure in which a sample is directly heated by using microwaves like the one disclosed in International Publication No. WO91/12888, the following problems are involved.

As an example, the apparatus shown in International Publication No. WO91/12888 has a structure that not only the sample 66 but also the coolant 102 should be heated simultaneously by the microwaves. To this end, the magnetron 63 must have a very large power. If such large power is used, however, it easily causes non-uniform temperature of the sample 66 and the coolant 102. Furthermore, if the structure is modified to heat only the sample 66, as soon as the sample 66 temperature rises the heat is released to the coolant through the sample container 65. Thus, efficient heating is not attainable.

It may be contemplated that, as shown in FIG. 7, for example, temperature adjustment of samples 76 is carried out by utilizing the property of a Peltier device that, by changing the electric current, the surface temperature thereof can be changed rapidly either to higher temperature side or lower temperature side. In such case, however, due to the restriction in respect to the shape of the Peltier device 714, the heat transfer surface has to be made to follow the shape of each Peltier device 714. Therefore, the sample containers 75 should have a shape such as shown in FIG. 7.

Alternatively, it may be contemplated that, as shown in FIG. 8, a temperature adjusting block 817 shaped to receive sample containers 85 is attached to a Peltier device 814 so that heat transfer to samples 86 is carried out through the temperature adjusting block 817. In such case, however, the response will be slower by an amount corresponding to the heat capacity of the temperature adjusting block. Therefore, rapid response would be unattainable.

On the other hand, as described in International Publication No. WO00/36880, it may be contemplated that the sample is heated by using efficient microwaves while the cooling is carried out by using a Peltier device. However, in summary, unless the temperature of the temperature adjusting medium (this being coolant 102 in FIG. 6 and Peltier device 714 in FIG. 7) which is in contact to the sample container can follow the temperature rise of the sample due to irradiation with the microwaves, even if the sample temperature is raised the heat is released to the cooling medium. Therefore, rapid temperature response of the cooling medium would unattainable. This would be easily understood from the fact that, since a temperature adjusting medium whose temperature can be changed rapidly with a change in the sample temperature due to the microwave heating is unavailable, the advantage of microwave high-speed heating doesn't work well.

These problems may be avoided by a structure that the contact of the sample container with the cooling medium is disengaged when the sample is heated by microwaves and that the sample container is brought into contact with the cooling medium only when it should be cooled. In such structure, during heating, the heat is not released from the sample to the cooling medium and, thus, the advantage of high-speed heating based on the microwave heating may work well. However, it requires use of a moving mechanism for moving the container away from the cooling medium and, therefore, the apparatus structure becomes complicated. Furthermore, the cooling mechanism itself is unchanged from conventional structures, high-speed response of the cooling process is still unattainable.

In summary, these problems are attributable to the fact that, although the heating amount to a sample can be changed as desired and rapidly by using microwaves, effective means for rapidly changing the cooling amount to the sample is unavailable. While many developments related to PCR apparatuses are being made in recent years, a cooling mechanism that makes it possible to best use the advantage of the microwave heating has never been described.

SUMMARY OF THE INVENTION

It is accordingly an object of the present invention to provide a sample temperature adjusting system with cooling means that enables high-speed cooling, by which efficiency of temperature adjustment can be improved further and by which the advantage of microwave heating, that is, high-speed heating of a sample, can be best used.

In accordance with an aspect of the present invention, there is provided a temperature adjusting system for adjusting temperature of a sample, comprising: a sample container for containing a sample therein; and a cooling unit for applying a liquid to a surface of said sample container, to cool the sample on the basis of heat of vaporization of the liquid on the surface of said sample container.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

Preferred embodiments of the present invention will now be described with reference to the attached drawings.

Embodiment 1

Figure 1:
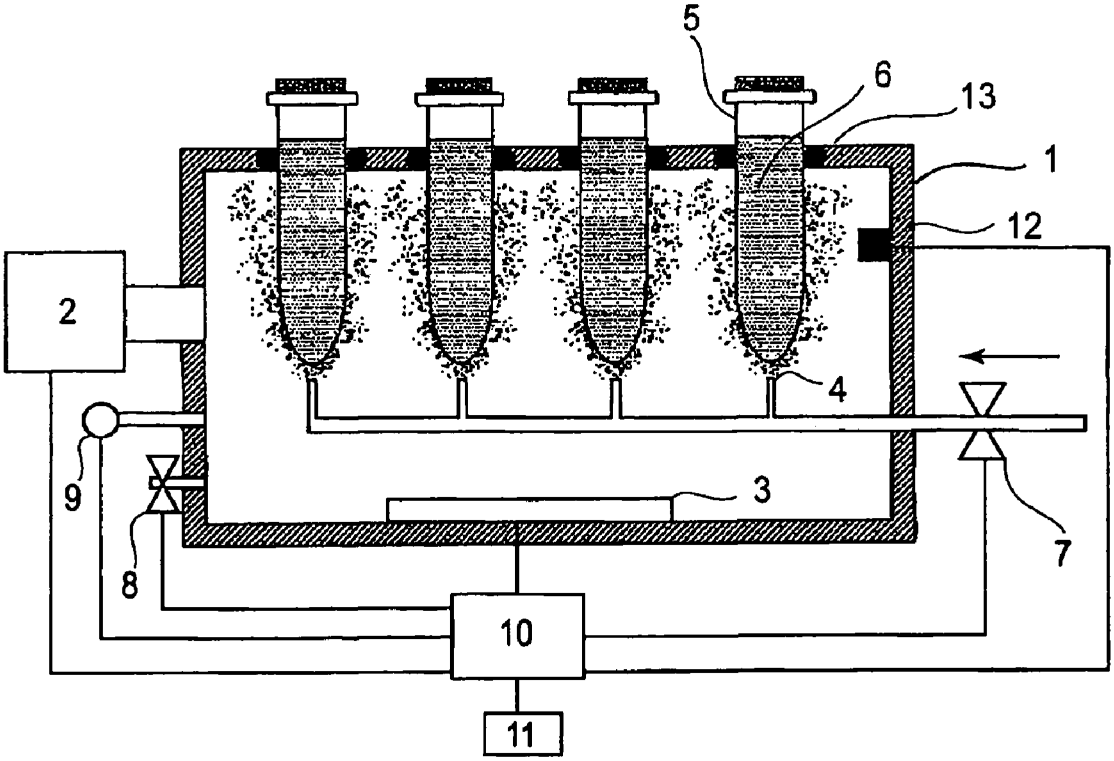
FIG. 1 is a schematic view of a general structure of a PCR apparatus according to a first embodiment of the present invention.

In the fist embodiment of the present invention, the invention is applied to provide a PCR apparatus. FIG. 1 shows a general structure of the PCR apparatus of this embodiment.

In FIG. 1, denoted at 1 is a reduced pressure container, and denoted at 2 is an exhaust system. Denoted at 3 is a magnetron, and denoted at 4 are discharging nozzles. Denoted at 5 are sample containers, and denoted at 6 are samples (PCR reaction solutions).

Denoted at 7 is a discharging liquid quantity adjusting valve, and denoted at 8 is a leak valve. Denoted at 9 is a pressure gauge, and denoted at 10 is a controller. Denoted at 11 is a terminal, and denoted at 12 is a non-contact temperature gauge. Denoted at 13 are seal rings.

Each container 5 contains a PCR reaction solution (sample) 6 therein, and the containers are inserted into the reduced pressure container 1 while being sealed by the seal rings 13 against the outside atmosphere.

The reduced pressure container 1 is equipped with the exhaust system 2 having a pump, for example, as well as the pressure gauge 9 and the leak valve 8, connected thereto. With this structure, the inside pressure of the reduced pressure container 1 can be changed as desired.

The magnetron 3 is provided inside the reduced pressure container 1. By controlling the microwave output of the magnetron 3, the heating amount to the PCR reaction solution 6 can be adjusted as desired.

In order to make the best use of the advantage of efficient heating by the microwave heating, in this structure the cooling of the PCR reaction solutions 6 is carried out on the basis of heat of vaporization. More specifically, water is introduced through the adjusting valve 7 from the outside of the reduced pressure container 1, and the water is sprayed toward the sample containers 5 through the discharging nozzles 4.

Here, for the purpose of producing appropriate sprayed water drops, the liquid may be mixed with a gas such as air, for example, and such mixture may be discharged into the container. However, this should be done in a range not adversely affecting the state of the reduced pressure being held by the exhaust system 2. Anyway, in that occasion, an additional cooling effect of the gas due to adiabatic expansion of the gas is available.

After small water drops adhere to the sample container, the water is vaporized while taking heat away from the PCR reaction solution 6. For facilitating vaporization of water, the pressure inside the container 1 is kept reduced by means of the exhaust system 2.

The non-contact thermometer 12 is provided to measure temperatures of the samples 16. As a matter of course, depending on the apparatus structure, it may be arranged to measure the temperature of a representative sample.

Here, although the non-contact thermometer generally refers to an infrared temperature gauge, it is an alternative that a temperature-sensitive liquid crystal contained in a microcapsule is mixed in the sample 6 so that the temperature of the sample 6 is measured by detecting reflection light from the liquid crystal, in the microcapsule, by using an optical sensor. The temperature-sensitive liquid crystal refers to such material in which crystal orientation changes with the temperature around the liquid crystal. As a further alternative, a phosphor or fluorescent material which emits a color, changing with the temperature, may be mixed in the sample 6 so that the temperature of the sample is measured by measuring the reflection light from the fluorescent material.

The non-contact thermometer 12, the magnetron 3, the adjusting valve 7, the exhaust system 2, the pressure gauge 9 and the leak valve 8 are connected to the control unit 10. The control unit 10 functions to adjust the magnetron 3 and the adjusting valve 7 on the basis of an output of the non-contact thermometer 12 and in accordance with a sample temperature profile, set by the terminal 11, to thereby adjust the temperature of the sample 6. Furthermore, the control unit 10 operates, when the sample container 5 is going to be demounted from the reduced pressure container 1, to control the leak valve 8 on the basis of the output of the pressure gauge 9, thereby to adjust the inside pressure of the reduced pressure container 1 to a predetermined pressure (atmospheric pressure).

The heat that can be taken away when the water is vaporized into a gas from a liquid (namely, the heat of vaporization) reaches up to about 2400 J per 1 g. If this heat quantity all can be used for the cooling, then, as an example, the aqueous-solution sample temperature of 10 cc can be lowered by 57° C.

Furthermore, since the water has a vapor pressure of 611 [Pa] even when the water temperature is 0° C., if the inside pressure of the reduced pressure container 1 is kept at about 500 Pa or lower, the water drops can be vaporized instantaneously as they get vaporization heat. Thus, the vaporization of the water drops is accelerated. It should be noted here that, because there is a possibility that the discharging nozzles 4 and the reduced pressure container 1 as well are cooled by vaporization of any water drops adhered to them, heaters (not shown) may be provided at appropriate positions to prevent any adverse influence.

Although in the example described above water is used as the liquid to be discharged, any liquid having a lower vapor pressure than the water, such as ethyl alcohol, diethyl ether or benzene, for example, may be used. Particularly, the boiling point of diethyl ether at an atmospheric pressure is 34.6° C., and this temperature is lower than the lowest sample temperature 37° C. of the PCR reaction process. This means that, where diethyl ether (vaporization heat 351 [J/g]) is used as a discharging liquid, there is no problem in the cooling for the PCR reaction even if the inside pressure of the container 1 is at an atmospheric pressure. In other words, if this structure is used, the exhaust system 2 can be made smaller in size and, in some cases, it can be omitted. However, because the evaporation heat of these materials is not large as the water, the discharging amount should be increased and, furthermore, they should be handled carefully because they may have an adverse influence to human body.

If the liquid can be controlled in pressure or temperature, for example, until it is discharged through the nozzle 4, even a liquid having small vapor pressure such as ammonia, acetylene or liquid nitrogen can be used and, therefore, lower temperature cooling can be accomplished.

The sequential operation of the PCR reaction using the apparatus of this embodiment will now be explained with reference to the flow charts of FIGS. 2 and 3.

Figure 2:
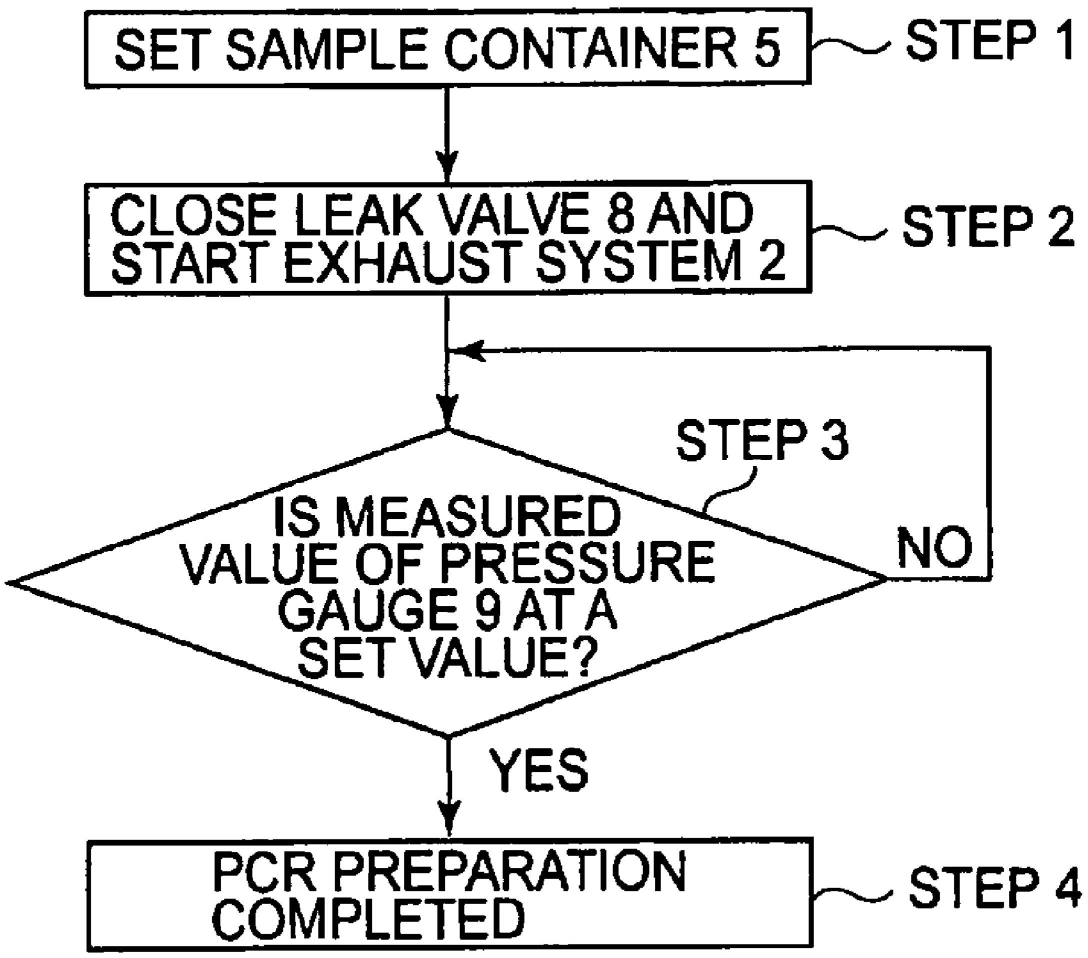
FIG. 2 is a flow chart related to the PCR apparatus of the first embodiment.
Figure 3:
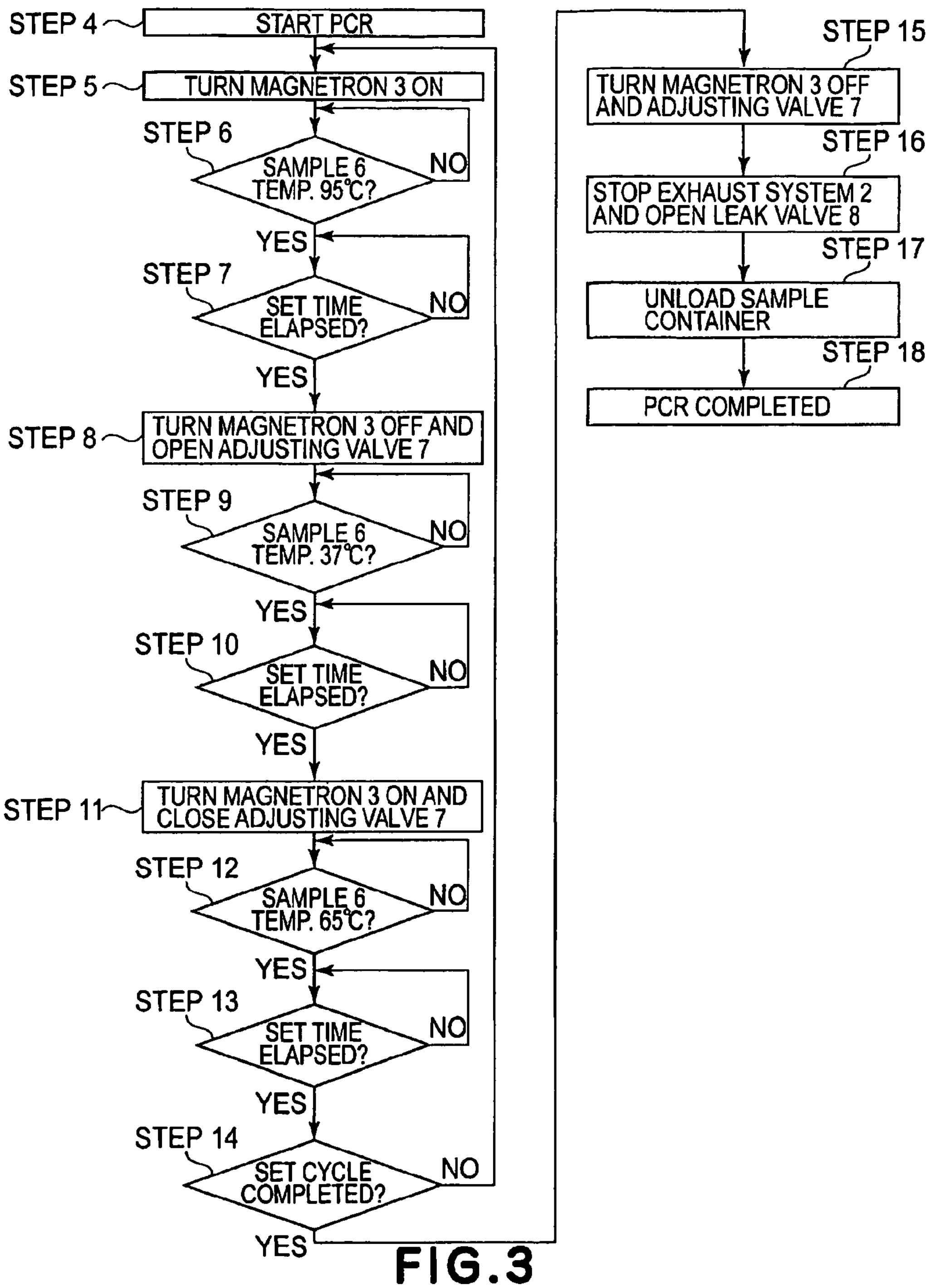
FIG. 3 is a flow chart related to the PCR apparatus of the first embodiment.

First of all, in the flow chart of FIG. 2, a sample container 5 having a PCR reaction solution 6 accommodated therein is inserted into the seal ring 13 portion (step 1).

If it is confirmed that the sample container has been inserted steadily, the controller 10 closes the leak valve 8 and starts the exhaust system 2 (step 2).

If the sample container 5 is inserted steadily and the output of the pressure gauge 9 shows that an appropriate pressure is reached (it being about 500 Pa or lower where the discharging liquid is water), the preparation is completed (step 3).

Here, it should be noted that, when the sample container 5 is inserted steadily, the temperature of the sample 5 decreases slightly due to adiabatic expansion of the gas in the pressure-reducing process inside the container 1. If it is desired to avoid influence of this, the output of the magnetron 3 may be adjusted while monitoring the output of the thermometer 12, to suppress the temperature decrease.

Subsequently, in the flow chart of FIG. 3, upon start of PCR (step 4) and in response to the operator's instruction for initiating PCR reaction (step 5), first the output of the magnetron 3 is increased to raise the sample temperature at a burst up to 95° C. (step 6). Since the microwave heating method is a method for heating the sample 6 itself, as compared with the heat-transfer heating from the sample container 5, the temperature rises uniformly. Furthermore, since the pressure around the surface of the sample container 5 is close to vacuum, due to vacuum insulation the heat is not released from the surface. Therefore, efficient heating is attainable. After that, on the basis of the output of the thermometer 12, the output of the magnetron 3 is adjusted to keep the sample temperature constant during a set time (step 7). Then, to cool the sample down to 37° C., the output of the magnetron 3 is discontinued, and the adjusting valve 7 is opened (step 8). Then, through the discharging nozzle 4, the water is discharged as a spray such that a large number of small water drops are adhered to the sample container 5.

The adhered water drops are vaporized while taking the heat away from the sample container, the heat corresponding to the heat of vaporization. This means that, even if the sample 6 temperature becomes close to a set temperature, the cooling amount is unchanged and cooling can be continued constantly. In other words, although in a heat-transfer cooling system using a coolant or the like the heat-transfer amount (i.e., cooling amount) is slowed down as the temperature difference between the coolant and the sample 6 decreases, when the vaporization heat is used as in this embodiment, the cooling amount is kept unchanged until the set temperature is reached and high-speed cooling is accomplished.

Furthermore, the effect of vacuum insulation largely attributes to high-speed heating/cooling. Since the cooling amount is proportional to the discharging amount, the cooling amount can be controlled by adjusting the discharging amount through the adjusting valve 7. However, if the discharging amount is enlarged unconditionally, vaporization would not be accomplished efficiently. Thus, the discharging amount is determined while keeping a good balance between the vaporization efficiency and the cooling amount.

Furthermore, both of the adjusting valve and the magnetron 3 may be adjusted so that the vaporization-heat cooling and the microwave heating are carried out in parallel. This assures higher precision temperature adjustment. After the sample temperature decreases to 37° C. (step 9), the adjusting valve 7 and the magnetron 3 are adjusted to keep that temperature for another set period (step 10). The temperature can be kept easily also in this occasion, due to the effect of vacuum insulation. After this, the adjusting valve 7 is closes to raise the sample temperature up to 65° C. (step 11). Then, microwaves are outputted from the magnetron 3 and, after the temperature rise is achieved (step 12), the temperature is held for another set period (step 13) by adjusting the output of the magnetron 3 and the adjusting valve 7. Then, one cycle of PCR reaction is completed (step 14).

After that, the above-described cycle is repeated by a predetermined number. After all the processes of PCR reaction are completed (step 15), the exhaust system 12 is stopped and the leak valve is opened (step 16). As the pressure inside the reduced pressure container 1 becomes equal to the atmospheric pressure, the sample container 5 is demounted (step 17). Thus, the sequence is finished (step 18).

Embodiment 2

In the second embodiment of the present invention, the invention is applied to provide a second PCR apparatus.

Figure 4:
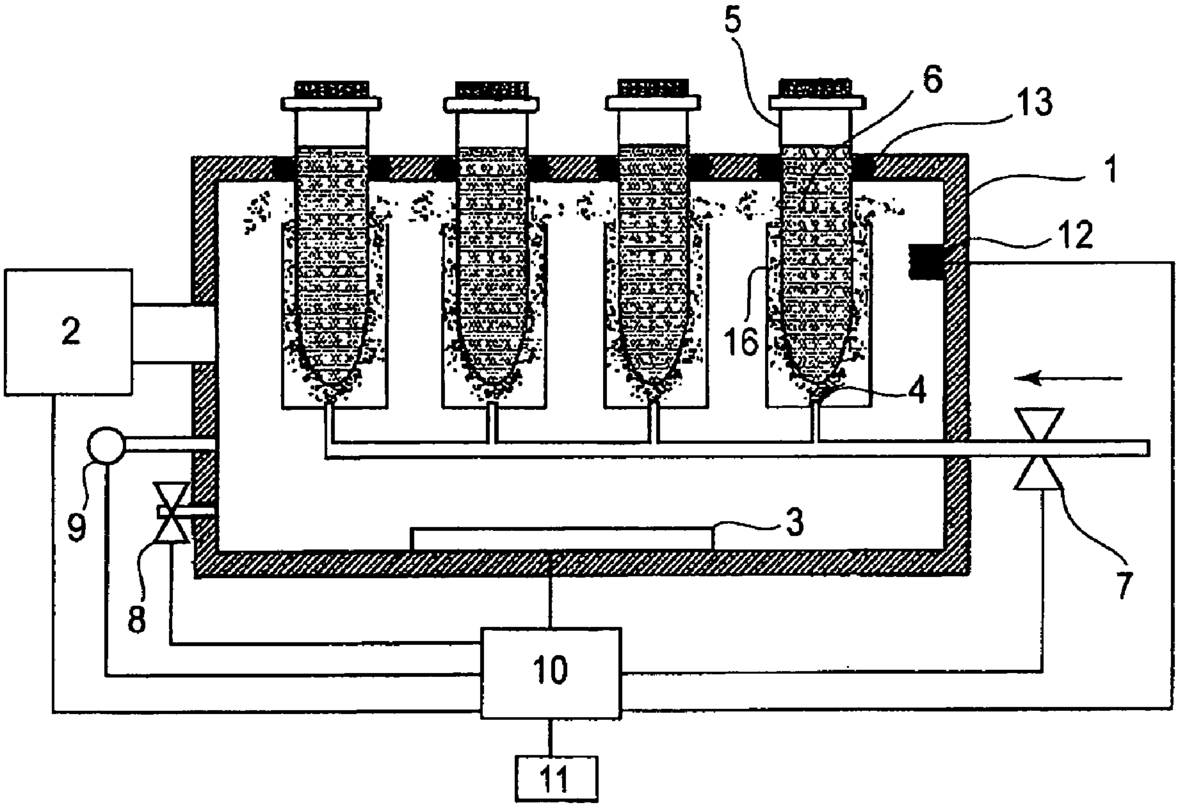
FIG. 4 is a schematic view of a general structure of a PCR apparatus according to a second embodiment of the present invention.

FIG. 4 shows a general structure of the PCR apparatus of the second embodiment. Like numerals as those of the structure of the first embodiment shown in FIG. 1 are assigned to similar or corresponding elements, and duplicate explanation of them are omitted. The basic apparatus structure of the second embodiment is similar to the first embodiment, but the second embodiment differs from the first embodiment in that shielding covers 16 are mounted each being to cover a portion of a sample container 5.

In this embodiment, the provision of shielding covers 16 each for covering a portion of a corresponding sample container 5 is effective to prevent sprayed liquid from being adhered to any portion other than the sample container 5 to cool such portion unnecessarily. As a matter of course, water drops may adhere to the shielding cover 16 and, therefore, if necessary, heater means (not shown) may be provided to perform temperature adjustment to avoid unwanted influence.

In order to assure that the liquid is adhered to the sample container uniformly as much as possible and that most of the discharged liquid is adhered to the sample container 5, each nozzle may be arranged so that it discharges the liquid laterally to the sample container 5 as viewed in the drawing. Alternatively, plural nozzles may be used, and these nozzles may be shaped appropriately. In these cases, the cooling efficiency can be improved further.

Embodiment 3

In the third embodiment of the present invention, the invention is applied to provide a rapid quenching system for samples.

Figure 5:
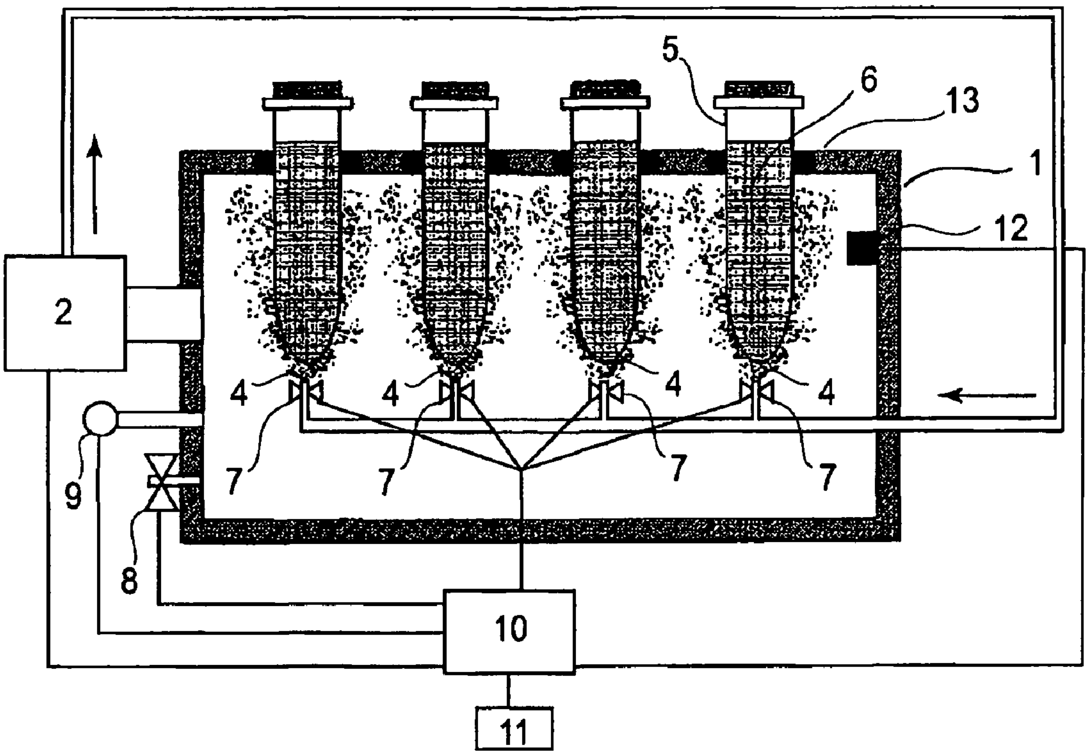
FIG. 5 is a schematic view of a general structure of a cooling system for samples, according to a third embodiment of the present invention.
Figure 6:
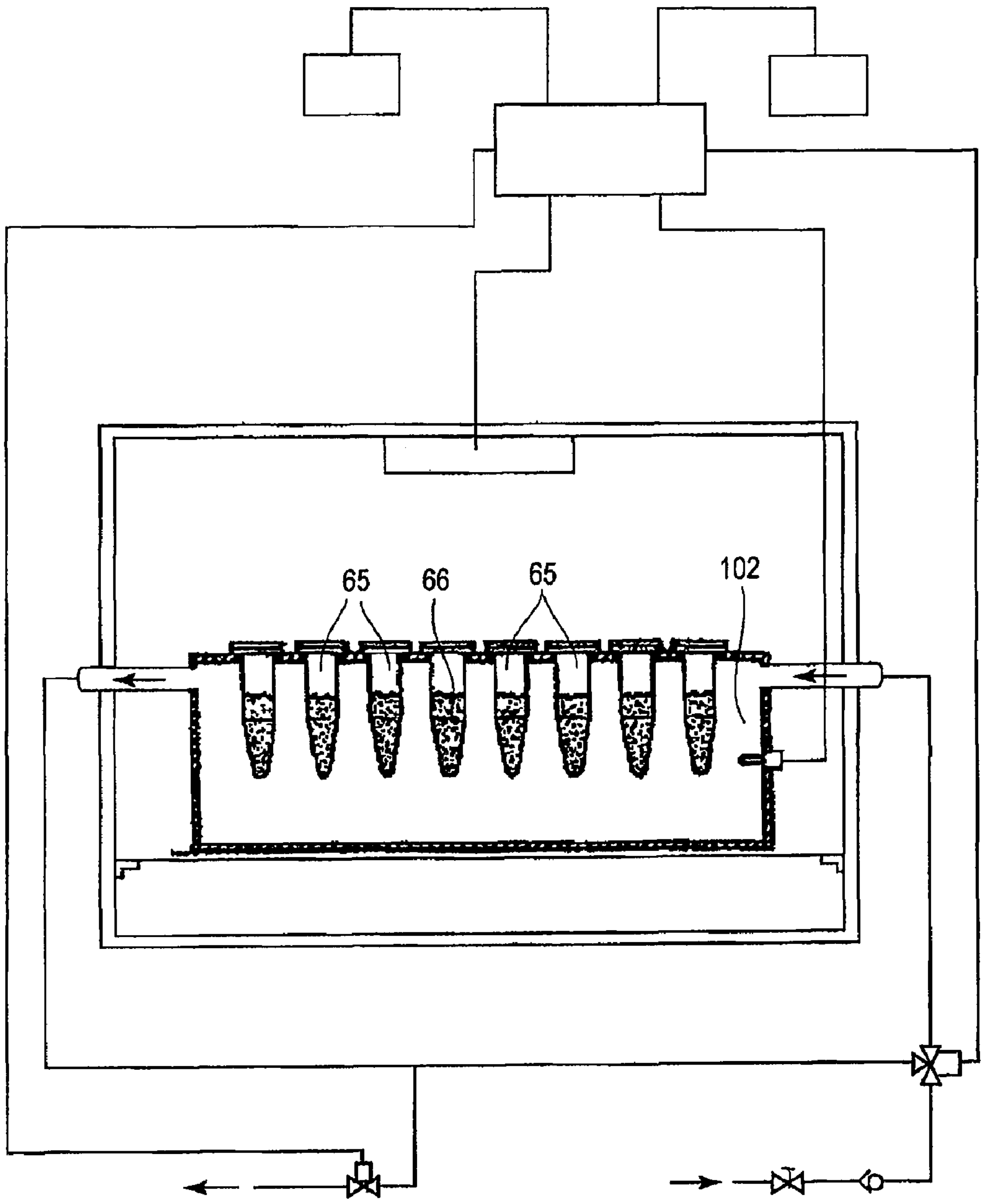
FIG.6 (Prior Art)
FIG. 6 is a schematic view of a general structure of a conventional PCR apparatus.
Figure 7:
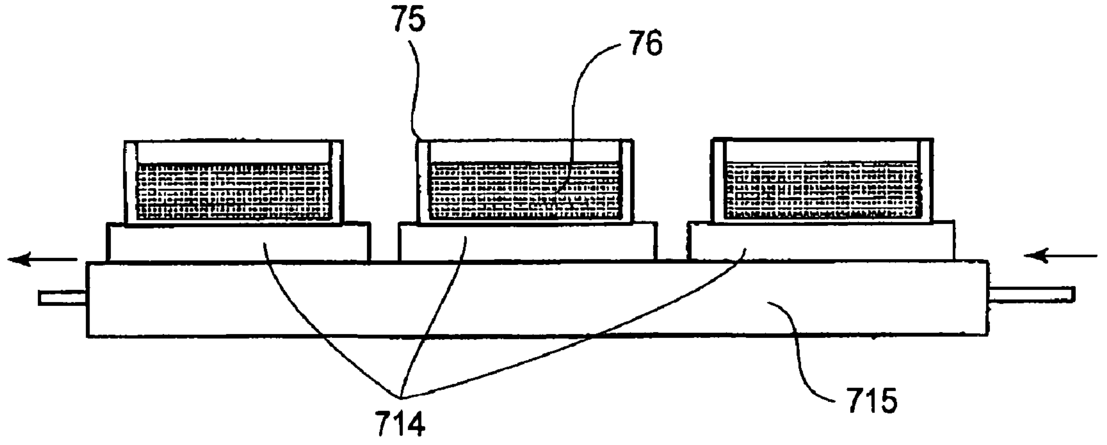
FIGS. 7 and 8 are schematic views, respectively, for explaining possible structures for a sample temperature adjusting system having been considered by the inventor of the subject application.
Figure 8:
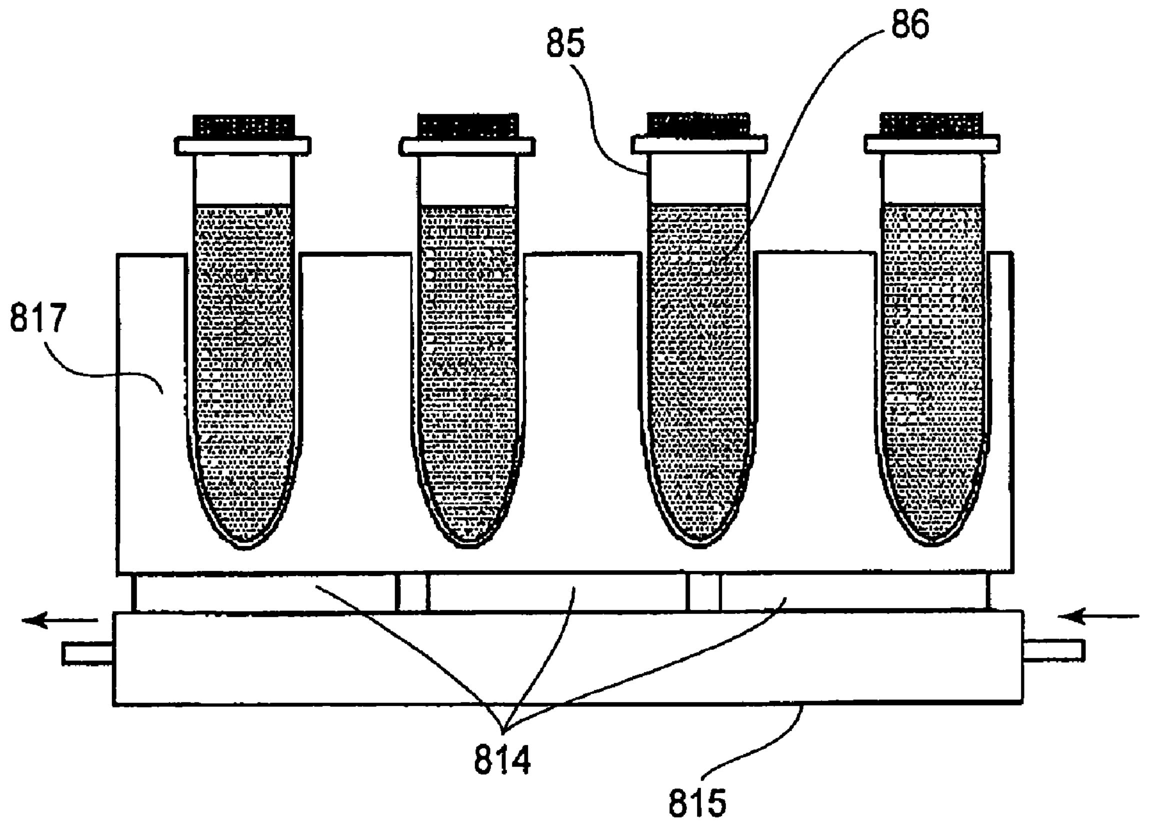

FIG. 5 shows a general structure of a sample cooling system according to the third embodiment. Like numerals as those of the structure of the first embodiment shown in FIG. 1 are assigned to similar or corresponding elements, and duplicate explanation of them are omitted. The basic apparatus structure of the second embodiment is similar to the first embodiment, but the third embodiment differs from the first embodiment in that no magnetron is incorporated and that the samples are rapidly quenched and refrigerated for preservation.

Conventionally, a sample container is put into liquid nitrogen to rapidly quench and refrigerate a sample for preservation. In such case, however, the liquid nitrogen is used basically as a disposable and it is very wasteful. Furthermore, the availability of liquid nitrogen is limited and only limited users can use it. Moreover, in that case, the temperature of the sample is finally cooled to −195° C. corresponding to the boiling point of the liquid nitrogen. It is very difficult to stop the cooling at a desired set temperature of −50° C., for example.

In consideration of these inconveniences, in the embodiment, the cooling process based on vaporization heat is applied to cool the sample container, and a rapid quenching system for samples is provided.

In FIG. 5, as regards the coolant that produces heat of vaporization, ammonia having large vaporization heat and low vapor pressure is used. As a result of this, even if the inside pressure of the reduced pressure container 1 is at the atmospheric pressure, the cooling amount to −38° C. is assured. If the pressure is reduced by using the exhaust system 2, the cooling amount can meet much lower temperatures. Here, in order to keep the ammonia in liquid state just before it is sprayed, a high pressure such as about 10 atm should be maintained. To this end, each valve 7 is provided adjacent a corresponding discharging nozzle 4.

Furthermore, as compared with the first embodiment, the exhaust system 2 is not arranged to discharge gaseous ammonia outwardly but it is arranged to pressurize and liquefy the gaseous coolant such that high-pressure ammonia liquid is circulated and supplied to the discharging nozzles 4.

By circulating the coolant as described above, replenishment of the coolant becomes unnecessary so that the quenching system can be used unconditionally. Furthermore, since the discharging amount of the coolant is adjustable, the cooling amount and yet the cooling rate can be adjusted. Moreover, if a non-contact thermometer 12 is used, rapid quenching to a set temperature can be done. Further, although in this embodiment ammonia is used as a coolant, the invention is not limited to this. Appropriate coolant may be chosen in accordance with a required cooling temperature or the apparatus structure.

In accordance with the embodiments of the present invention described hereinbefore, a cooling system may comprise a discharging nozzle for discharging a liquid toward the surface of a sample container so that the liquid is adhered to the container surface, and an adjusting valve for adjusting the amount of liquid to be adhered. This structure enables a fast cooling rate while allowing adjustment of the cooling amount for the sample.

Furthermore, the discharging nozzle may be shaped and arranged to discharge the liquid as a spray and, in that occasion, the liquid can be adhered to the surface of the sample container uniformly. This assures even cooling of the sample. The reduced pressure container 1 may be pressure-decreased by using an exhaust system 2, by which at least a portion of the surface of the sample container is placed in a reduced pressure or vacuum ambience. This facilitates vaporization of the liquid, and it enlarges the degree of freedom in respect to choosing the type of liquid.

The sample container may be equipped with a shielding cover for covering at least a portion of the surface of the sample container. This ensures that the discharged liquid is adhered to the sample container without waste.

These cooling systems are particularly effective when used with a sample temperature adjusting system having a magnetron 3 for heating the sample by microwaves. Where a non-contact temperature gauge is provided to detect the temperature of the sample, the apparatus structure becomes very simple and the operability is improved significantly. Where such sample temperature adjusting system is incorporated into a PCR apparatus, the temperature of samples can be changed rapidly and, finally, the entire process time of PCR reaction can be reduced considerably.

In accordance with the embodiments of the present invention described hereinbefore, due to the effect of vacuum insulation, thermal disturbance during the heating or cooling process can be prevented, and efficient cooling or heating can be done.

In conventional heating or cooling structures based on heat transfer, the amount of heat transfer decreases as the temperature difference between the sample and the temperature adjusting medium becomes small (i.e., the sample temperature becomes close to the set temperature). In accordance with an embodiment of the present invention, as compared therewith, a cooling system based on heat of vaporization of a liquid and a microwave heating system are used in combination. This makes it possible to change the adjusted heat quantity as desired independently of the sample temperature, and thus, high speed temperature adjustment can be accomplished.

In accordance with the embodiments of the present invention described above, a cooling system that can perform rapid cooling while making the best use of the advantage of microwave heating, i.e., high speed heating of the sample, is provided. Therefore, a sample temperature adjusting system by which the temperature adjustment efficiency is improved further is provided.

While the invention has been described with reference to the structures disclosed herein, it is not confined to the details set forth and this application is intended to cover such modifications or changes as may come within the purposes of the improvements or the scope of the following claims.

This application claims priority from Japanese Patent Application No. 2004-326097 filed Nov. 10, 2004, for which is hereby incorporated by reference.

What is claimed is:

1. A temperature adjusting system for adjusting temperature of a sample, comprising:

a sample container for containing a sample therein; and a cooling unit for applying a liquid to a surface of said sample container, to cool the sample on the basis of heat of vaporization of the liquid on the surface of said sample container;

wherein said cooling unit comprises a discharging nozzle for discharging the liquid toward the surface of said sample container to apply the liquid onto the container surface, and an adjusting valve for adjusting the amount of liquid to be applied to the container surface.

2. A temperature adjusting system according to claim 1, wherein said discharging nozzle sprays one of a liquid and a mixture of a liquid and a gas.

3. A temperature adjusting system according to claim 1, further comprising a reduced pressure container and an exhaust system for reducing a pressure inside said reduced pressure container, wherein a portion of said sample container is sealingly inserted into said reduced pressure container and said sample container is held thereby.

4. A temperature adjusting system according to claim 3, further comprising a shielding cover for covering at least a portion of the surface of said sample container.

5. A temperature adjusting system according to claim 3, further comprising a heating unit for heating the sample on the basis of microwave heating.

6. A temperature adjusting system according to claim 3, further comprising a non-contact thermometer for detecting a temperature of the sample.

7. A temperature adjusting system according to claim 1, wherein the liquid consist of at least one of water, ethyl alcohol, diethyl ether, benzene, ammonia, acetylene, and liquid nitrogen.

8. A temperature adjusting system according to claim 1, further comprising a shielding cover for covering at least a portion of the surface of said sample container.

9. A temperature adjusting system according to claim 1, further comprising a heating unit for heating the sample on the basis of microwave heating.

10. A temperature adjusting system according to claim 1, further comprising a non-contact thermometer for detecting a temperature of the sample.

* * * * *